United States Patent
Shah et al.

(10) Patent No.: US 10,902,312 B2
(45) Date of Patent: Jan. 26, 2021

(54) TRACKING AXES DURING MODEL CONVERSION

(71) Applicant: QUALCOMM Incorporated, San Diego, CA (US)

(72) Inventors: Tejash Shah, San Diego, CA (US); Durk Van Veen, Santee, CA (US)

(73) Assignee: Qualcomm Incorporated, San Diego, CA (US)

(*) Notice: Subject to any disclaimer, the term of this patent is extended or adjusted under 35 U.S.C. 154(b) by 807 days.

(21) Appl. No.: 15/702,503

(22) Filed: Sep. 12, 2017

(65) Prior Publication Data

US 2018/0285717 A1 Oct. 4, 2018

Related U.S. Application Data

(60) Provisional application No. 62/477,918, filed on Mar. 28, 2017.

(51) Int. Cl.

| | |
|---|---|
| *G06N 3/04* | (2006.01) |
| *G06K 9/46* | (2006.01) |
| *G06F 8/76* | (2018.01) |
| *G06N 3/08* | (2006.01) |
| *G06K 9/00* | (2006.01) |
| *G06K 9/03* | (2006.01) |
| *G06N 3/02* | (2006.01) |

(52) U.S. Cl.
CPC ............. *G06N 3/0454* (2013.01); *G06F 8/76* (2013.01); *G06K 9/4628* (2013.01); *G06N 3/084* (2013.01); *G06K 9/00986* (2013.01); *G06K 9/03* (2013.01); *G06N 3/02* (2013.01); *G06N 3/0445* (2013.01); *G06N 3/0472* (2013.01); *G06N 3/088* (2013.01)

(58) Field of Classification Search
CPC ............................ G06N 3/02; G06N 3/30445
USPC ........................................................ 706/15, 45
See application file for complete search history.

(56) References Cited

U.S. PATENT DOCUMENTS

| | | | |
|---|---|---|---|
| 2004/0125103 A1* | 7/2004 | Kaufman | G06T 15/40 345/419 |
| 2010/0161666 A1* | 6/2010 | Do | G06F 16/258 707/791 |
| 2011/0004612 A1* | 1/2011 | Boyersmith | G06F 16/284 707/769 |
| 2016/0342888 A1 | 11/2016 | Yang et al. | |
| 2016/0358038 A1 | 12/2016 | Jaderberg et al. | |
| 2018/0349772 A1* | 12/2018 | Tokui | G06N 3/105 |

OTHER PUBLICATIONS

Jira A., "Convert trained caffe parameters to singa", Retrieved from Internet on Apr. 25, 2017, https://issues.apache.org/jira/browse/SINGA-278, pp. 1-2.

(Continued)

*Primary Examiner* — David R Vincent
(74) *Attorney, Agent, or Firm* — Seyfarth Shaw LLP

(57) ABSTRACT

A method of mapping a first operation of a source framework to a second operation of a target framework for an artificial neural network includes determining an alignment between a current source axis order and a current target axis order. The method also includes setting the current target axis order based on the alignment, and an expected source axis order of the first operation and/or an expected target axis order of the second operation.

32 Claims, 17 Drawing Sheets

(56) References Cited

OTHER PUBLICATIONS

"A Performance Library for Deep Learning", Intel(R) Math Kernel Library for Deep Neural Networks (Intel(R) MKL-DNN), Retrieved from Internet on Apr. 25, 2017, http://01org.github.io/mkl-dnn/, pp. 1-5.
Valigi N., "Converting a Deep learning model from Caffe to Keras", Retrieved from internet on Apr. 25, 2017, http://nicolovaligi.com/converting-deep-learning-model-caffe-keras.html, pp. 1-5.
International Search Report and Written Opinion—PCT/US2018/018797—ISA/EPO—dated Jun. 19, 2018.
Riba E., "DeepRosetta", Sep. 23, 2016 (Sep. 23, 2016), pp. 1-19, XP055479922, Retrieved from the Internet URL: https://github.com/edgarriba/DeepRosette [retrieved on May 30, 2018].

* cited by examiner

TRACKING AXES DURING MODEL CONVERSION

CROSS-REFERENCE TO RELATED APPLICATION

The present application claims the benefit of U.S. Provisional Patent Application No. 62/477,918, filed on Mar. 28, 2017 and titled "TRACKING AXES DURING MODEL CONVERSION," the disclosure of which is expressly incorporated by reference herein in its entirety.

BACKGROUND

Field

Certain aspects of the present disclosure generally relate to machine learning and, more particularly, to improving systems and methods of tracking axes during model conversion.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Training frameworks may be used to train deep learning models. The trained deep learning models may be executed on different inference engines such as the snapdragon neural processing engine (SNPE) library and other frameworks/inference engines, such as Caffe, Torch, or TensorFlow. That is, deep learning models may be trained using one framework and may be executed on a different framework. Before such models are executed on a different framework, the models may be subjected to a conversion process for mapping operations, such as a convolution, pooling, or concatenation, from a source framework to a target framework. The operations may receive a multi-dimensional input and generate a multi-dimensional output.

Each particular framework/inference engine performs various operations, where an input is received in a specified axis order and an output is produced in a fixed axis order. The specified axis order may differ from one framework to the next. Additionally, the specified axis for a framework may include more or fewer dimensions in comparison to other frameworks. Conversion between the frameworks can be challenging and result in computational errors. That is, mapping from one framework to the next may be challenging and may be exacerbated when complex models employ axis-manipulating operations such as permute, reshape, and flatten. It is desirable to provide an improved mapping process (e.g., conversion process).

SUMMARY

In one aspect of the present disclosure, a method of mapping a first operation of a source framework to a second operation of a target framework for an artificial neural network is disclosed. The method includes determining an alignment between a current source axis order and a current target axis order. The method also includes setting the current target axis order based on the alignment, and an expected source axis order of the first operation and/or an expected target axis order of the second operation.

Another aspect of the present disclosure is directed to an apparatus including means for determining an alignment between a current source axis order and a current target axis order. The apparatus also includes means for setting the current target axis order based on the alignment, and an expected source axis order of the first operation and/or an expected target axis order of the second operation.

In another aspect of the present disclosure, a non-transitory computer-readable medium with non-transitory program code recorded thereon is disclosed. The program code for mapping a first operation of a source framework to a second operation of a target framework for an artificial neural network is executed by a processor and includes program code to determine an alignment between a current source axis order and a current target axis order. The program code also includes program code to set the current target axis order based on the alignment, and an expected source axis order of the first operation and/or an expected target axis order of the second operation.

Another aspect of the present disclosure is directed to an apparatus for mapping a first operation of a source framework to a second operation of a target framework for an artificial neural network. The apparatus has a memory unit and one or more processors coupled to the memory unit. The processor(s) is configured to determine an alignment between a current source axis order and a current target axis order. The processor(s) is also configured to set the current target axis order based on the alignment, and an expected source axis order of the first operation and/or an expected target axis order of the second operation.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
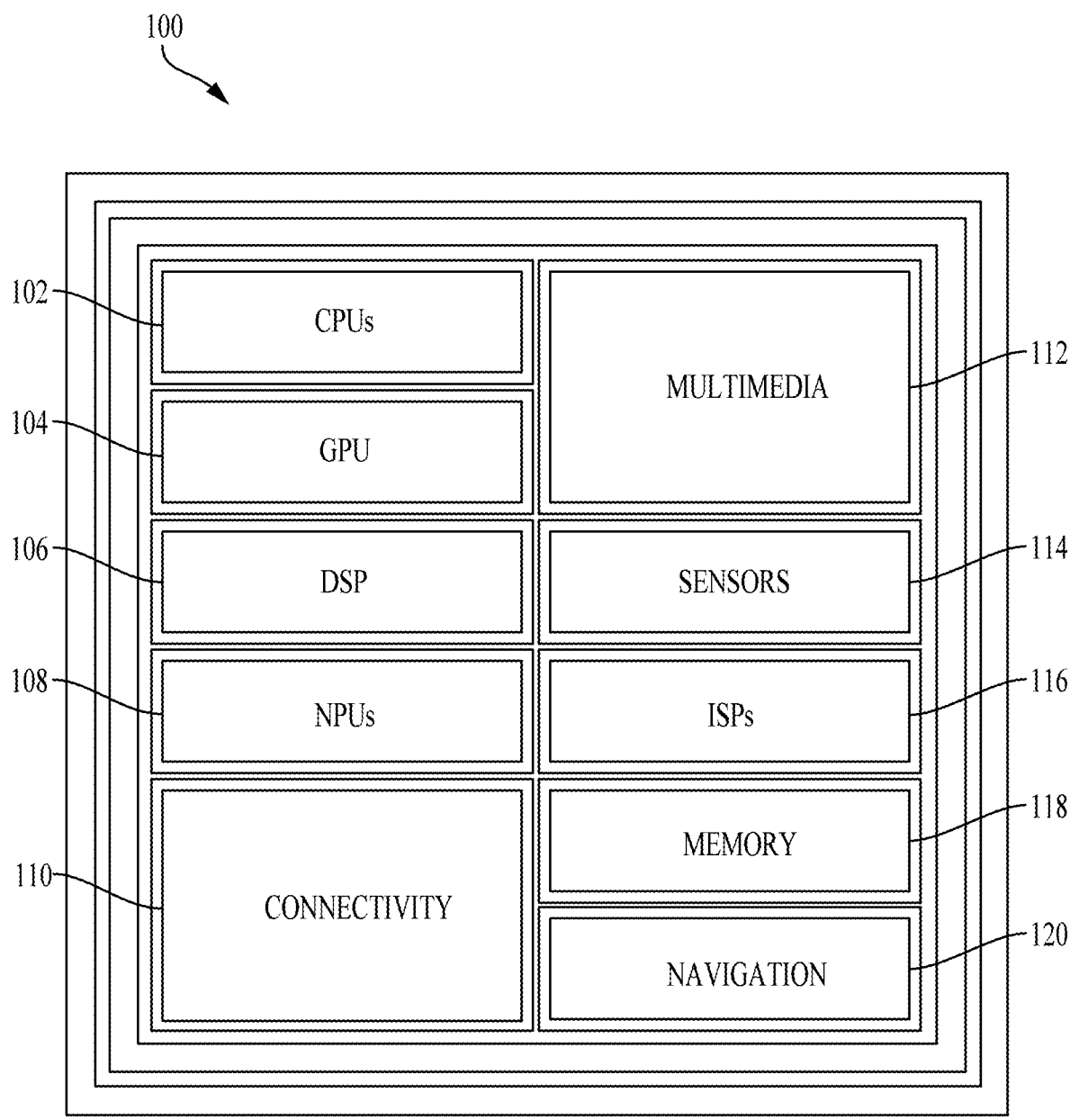
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Tracking Axes During Model Conversion

Training frameworks, such as Caffe, Torch, and Caffe2, for example, are used to train deep learning models. The trained deep learning models may be executed on inference engines (e.g., software libraries) that are different from the training framework, such as the snapdragon neural processing engine (SNPE) library. Before a model (e.g., deep learning model) is executed on an inference engine, the model is subjected to a conversion process for mapping operations such as a convolution, pooling, or concatenation from a source framework to a target framework. Each particular framework/inference engine performs operations expecting an input in a specified axis order and produces an output in a fixed axis order. In each framework, one or more inputs and outputs may be multidimensional. Furthermore, within each framework, each operation may receive a different input and produce a different output in comparison to other operations within the same framework. Conversion between the frameworks can be challenging and result in computational errors. The present disclosure is directed to a mapping process to convert the axes from a source framework (e.g., training framework) to the target framework (e.g., inference engine) using the alignment of the axes, for example.

Aspects of the present disclosure are directed to mapping a source framework to a target framework for an artificial neural network. In accordance with aspects of the present disclosure, the inputs of a source framework may be mapped to inputs of a target framework as follows.

FIG. 1 illustrates an example implementation of the aforementioned mapping using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code to determine an alignment between a first axis order of the source framework in the second axis order of the target framework. The instructions loaded into the general-purpose processor 102 may also comprise code to set the current target axis order based on the alignment, and an expected source axis order of the first operation and/or an expected target axis order of the second operation.

Figure 2:
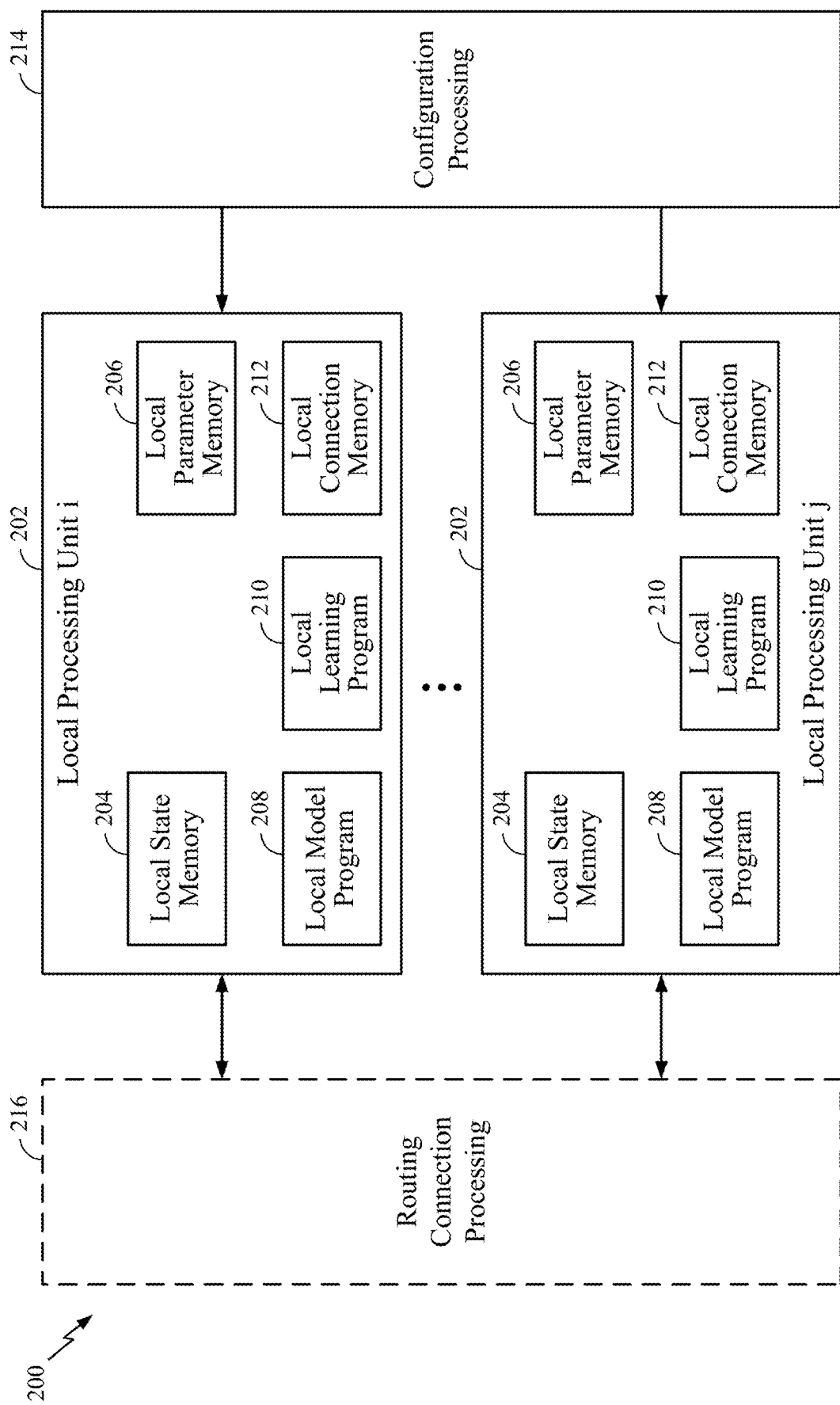
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
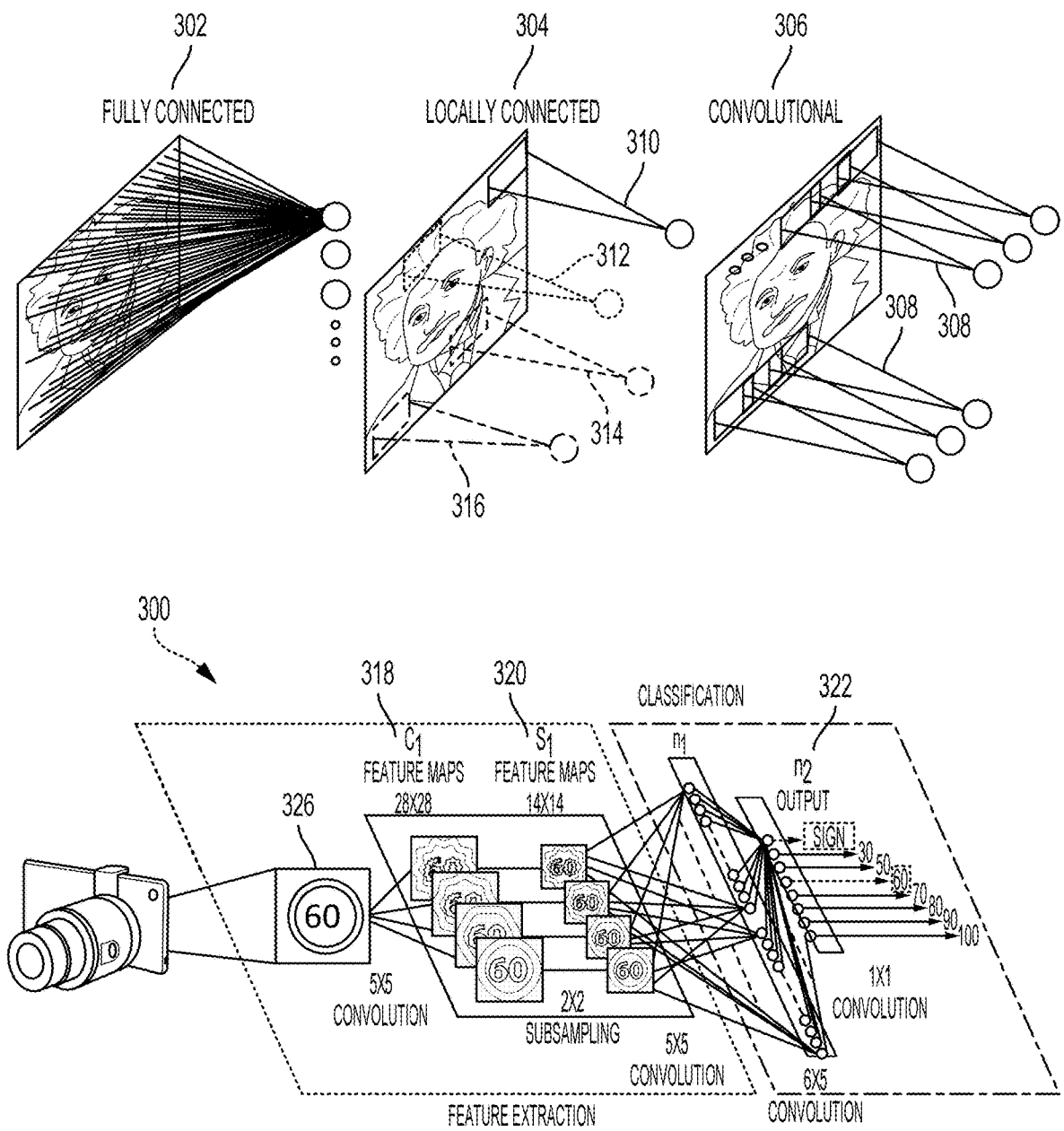
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, $max(0,x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
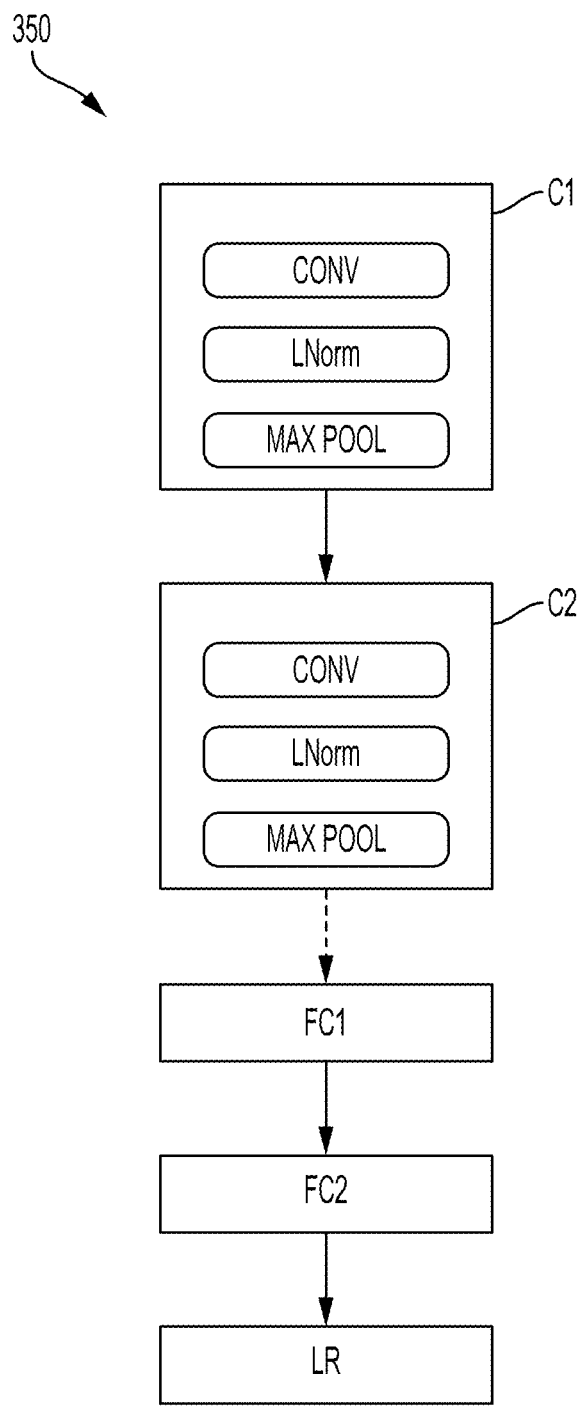
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
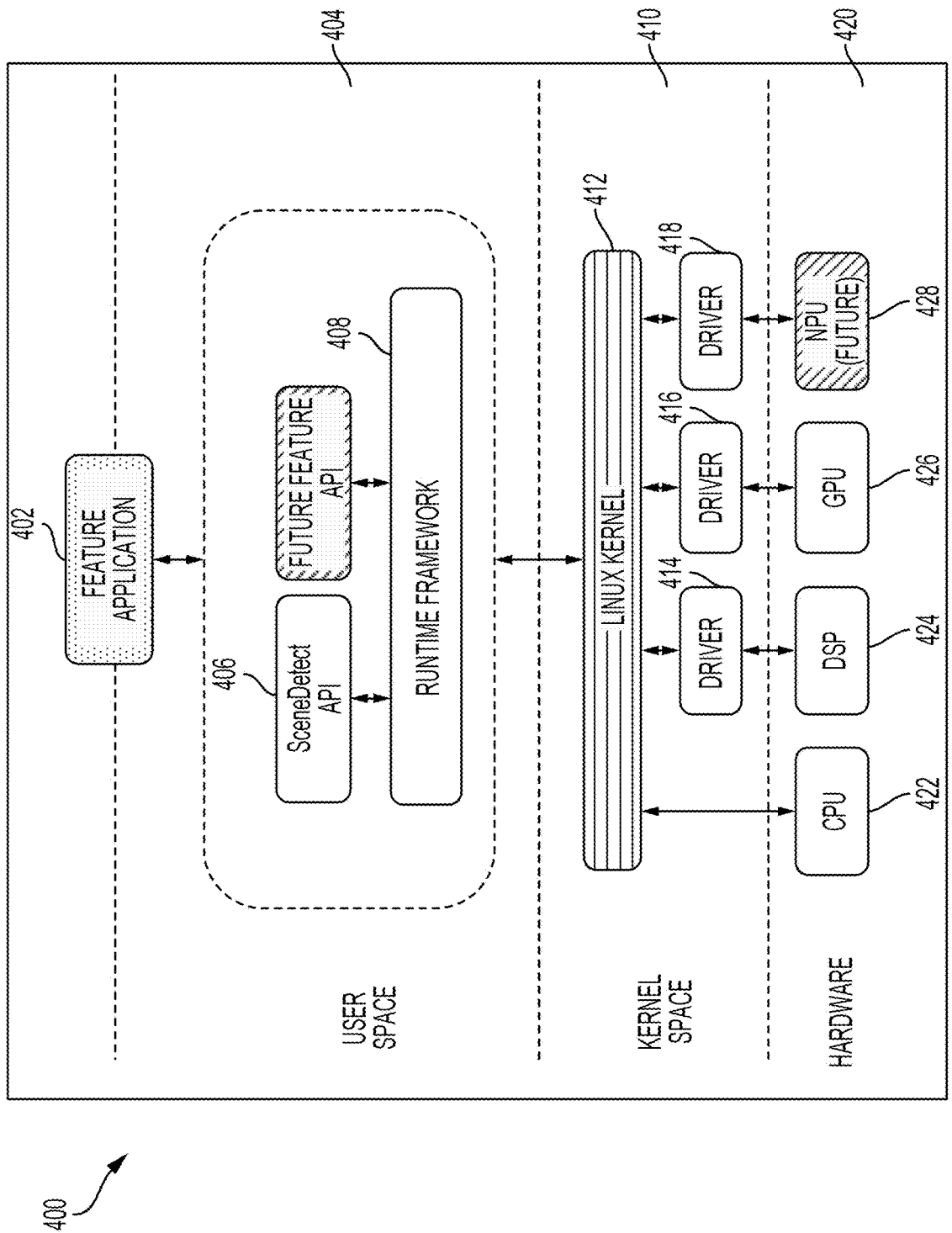
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

In one configuration, a machine learning model is configured for determining an alignment between a first axis order of the source framework in the second axis order of the target framework. The machine learning model is also configured for setting the current target axis order based on the alignment, and an expected source axis order of the first operation and/or an expected target axis order of the second operation. In one aspect, the determining means and/or setting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In one example, the Caffe framework uses a four-dimensional (4D) tensor for convolution with axis order (N, C, H, W) where N is the number of batches/images, C is the number of channels, H is a spatial dimension (height (H), and W is a spatial dimension (width (W)). In contrast, a target library (e.g., snapdragon neural processing engine (SNPE) library) may have a three-dimensional (3D) input tensor (H, W, C) with axis 0 as height (H), axis 1 as width (W) and axis 2 as channels (C). That is, the target library may not support N. Therefore, during the conversion process, the N may be dropped. Aspects of the present disclosure provide examples of a Caffe-to-SNPE conversion. Of course, aspects of the present disclosure are not limited to the cited frameworks and are contemplated for conversions between any type of framework.

Each library may read input tensors according to a specific axis order. For example, as discussed above, in the Caffe framework, the input tensor is read having an axis order of (N, C, H, W) where N is the number of batches. In the Torch framework, similar to Caffe, the input tensor is read as (N, C, H, W). In the TensorFlow development library, the input tensor is read as (H, W, C). Aspects of the present disclosure are not limited to the aforementioned frameworks and are contemplated for other types of frameworks.

Due to this difference in order of dimensions, the converter may, for example, translate a Caffe axis to an SNPE axis when a layer with a specific axis parameter is encountered. In conventional systems, these layers use axis parameters to select which dimension to work on (e.g., slice, concatenation, and Softmax).

Conventional model conversions use static-mapping. For example, during model conversion from the Caffe framework to the SNPE framework, the static-mapping is (0--1, 1-2, 2-0, 3-1). That is, Caffe index 0 is converted to SNPE index -1 (e.g., dropped from the SNPE frame), Caffe index 1 is converted to SNPE index 2, Caffe index 2 is converted to SNPE index 0, and Caffe index 3 is converted to SNPE index 1. For some operations, such as concatenate, slice, and Softmax, the static-mapping is used so that the target framework operates on the dimensions of the source framework. Still, with more complex models, and also with some operations, such as permute, reshape and flatten, the static axis mapping may result in using the wrong dimensions on the target framework, resulting in computational errors. Additionally, with some operations, such as reshape and flatten, an axis mapping may not be derived due to changes in dimensions and/or other factors.

The expected input and output axis order of each operation supported in both the source and target framework may be known a priori because each operation is implemented with a particular input/output axis order. For example, a convolution operation (cony) in SNPE has a known (e.g., published) input axis order of (H, W, C) and a known output axis order of (H, W, C). The input axis order refers to an axis order of a tensor that is input to an operation and the output axis order refers to an axis order of a tensor that is output from an operation. As another example, in Caffe, the known input axis order for the convolution operation is (N, C, H, W) and the known output axis order is also (N, C, H, W).

Figure 5A:
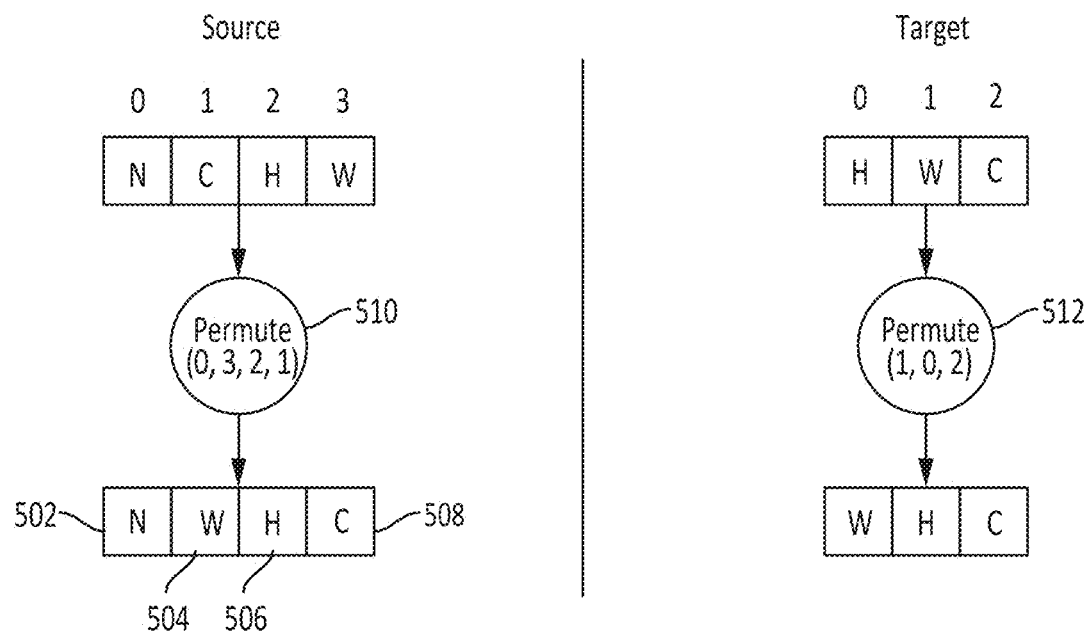
FIGS. 5A, 5B, 5C, 5D, and 5E are diagrams illustrating exemplary source framework to target framework conversions.

FIG. 5A illustrates an example of a transformation making use of an axis mapping according to aspects of the present disclosure. As shown in FIG. 5A, a permute operation 510 of source framework (e.g., Caffe) performs a transform operation of (0, 3, 2, 1). That is, after the permute operation 510, dimension 0 of the input is a first dimension 502 of the output, dimension 3 of the input is a second dimension 504 of the output, dimension 2 of the input is a third dimension 506 of the output, and dimension 1 of the input is a fourth dimension 508 of the output.

The input to a permute operation 512 of the target framework is different from the output of the permute operation 510 of the source framework. Thus, a translation should be performed for both permute operations 510, 512 to have the same output. Based on a known static-mapping, the (0, 3, 2, 1) operation may be translated in the target framework (e.g., SNPE) so that the permute operation 512 performs a transform operation of (1, 0, 2). That is, the source framework operation is translated in the target framework operation so that both permute operations 510, 512 have matching outputs (e.g., (W, H, C)).

Static-mappings from a source framework to a target framework assume that the input (e.g., input tensor) to a function/operation (e.g., permutation) will always be the same. For example, for the Caffe framework, the static-mapping assumes that the input to a function will be (N, C, H, W).

Figure 5B:
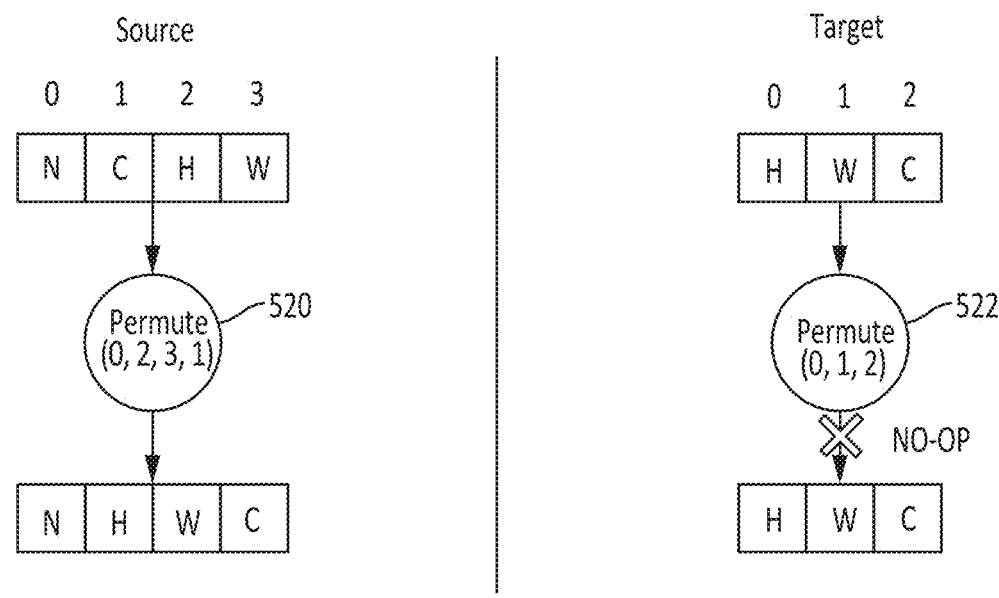

FIG. 5B illustrates another example of a transformation making use of an axis mapping according to aspects of the present disclosure. As shown in FIG. 5B, the input to a permute operation 522 of the target framework is aligned (e.g., matches) the output of a permute operation 520 of the source framework. As the output of the source framework matches the input of the target framework, a translation may be skipped. That is, the translation may be considered non-operational (no-op) because the permute order causes the output of the target framework to align with the output of the source framework, such that a transformation is not required.

Figure 5C:
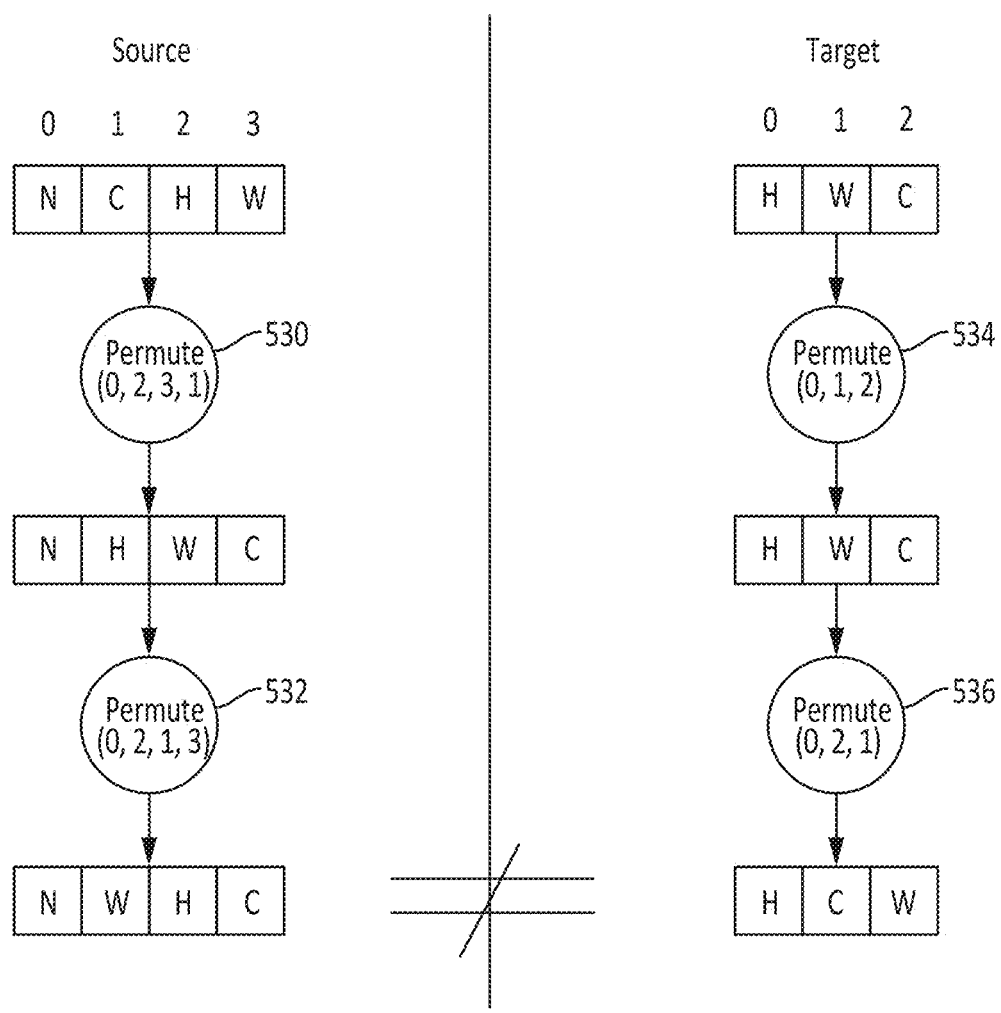

FIG. 5C illustrates an example of applying a transformation from a source framework to a target framework. As shown in FIG. 5C, two permutations (e.g., permutes) 530, 532 are performed at the source framework. The first permute 530 of the source framework performs a transform operation of (0, 2, 3, 1) on the input (N, C, H, W) to generate an output (N, H, W, C). The input to a first permute 534 of the target framework is the same as the output from the first permute 530 of the source framework (e.g., H, W, C). Thus, as previously discussed, due to the matching input and output, the translation is a no-op.

The second permute 532 of the source framework performs a transform operation of (0, 2, 1, 3) on the input (N, H, W, C) to generate an output (N, W, H, C). As previously discussed, for Caffe, it is assumed that the input will always be (N, C, H, W). In this example, the input to the permutation is (N, H, W, C). Due to the change in input format, the static-mapping results in a mismatch between the output of the second permutation 532 of the source framework (e.g., (N, W, H, C)) and the output of a second permutation 536 of the target framework (e.g., (H, C, W)).

That is, the second permute 532 of the source framework performs an operation of (0, 2, 1, 3). Using the static-mapping of Caffe-to-SNPE (e.g., (0--1, 1-2, 2-0, 3-1)), the translation to the second permute 536 of target framework is (0, 2, 1) (e.g., 0 maps to −1, 2 maps to 0, 1 maps to 2, and 3 maps to 1). When the second permute 536 of the target framework performs the operation (0, 2, 1) on the input of (H, W, C), the resulting output is (H, C, W), which does not match the output of the second permutation 532 of the source framework (e.g., (N, W, H, C)). Taking account for dropping the N dimension from the source framework, the expected output from the second permute 536 of target framework should match the output of the second permute 532 of the source framework (e.g., (W, H, C)). As shown in the example of FIG. 5C, using the static-mapping, multiple operations (e.g., permutations) may lead to a mapping error.

Figure 5D:
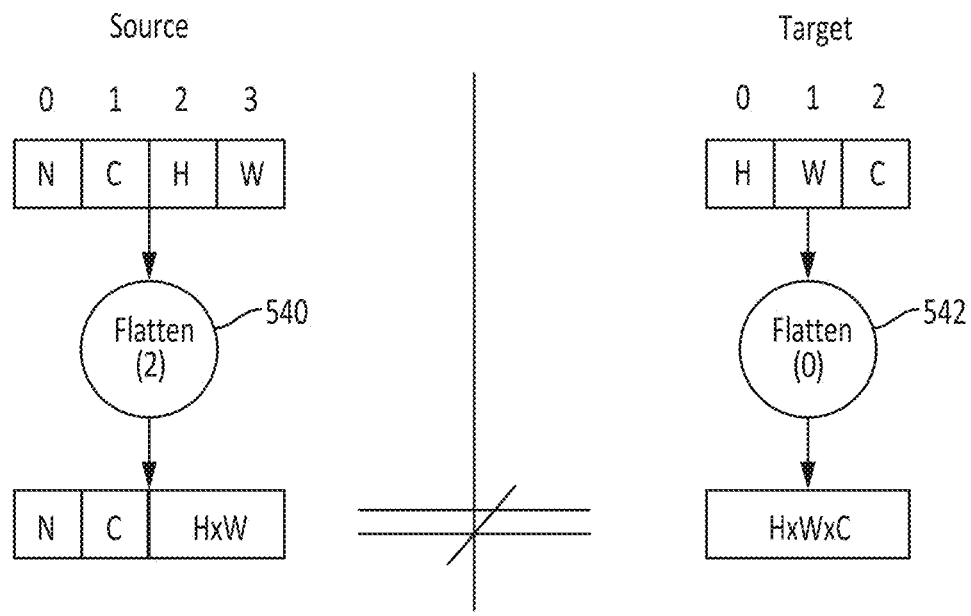

FIG. 5D illustrates an example of translating a flattening operation. As shown in FIG. 5D, a source framework performs a flatten operation 540 on an input (N, C, H, W). The flatten operation includes an axis parameter that indicates the dimension to be flattened. In this example, the axis parameter of the flatten operation 540 of the source framework is (2), such that the second dimension (e.g., dimension 2) and any subsequent dimensions are flattened. As shown in FIG. 5D, dimension 2 (H) and dimension 3 (W) are flattened in the output of the source framework to form a combined dimension (H×W). The other dimensions (e.g., dimensions 0 (N) and 1 (C)) of the source framework are maintained in the output of the source framework.

Using the static-mapping, the axis parameter for the flatten operation 542 the target framework is set to (0) so that both flatten operations 540, 542 begin with the height index (H). When the axis parameter of a flatten operation is set to 0, the dimension and subsequent dimensions (e.g., 1 and 2) are combined (e.g., flattened). In this example, the output of the flatten operation 542 of the target framework is the combined input (H×W×C). As shown in FIG. 5D, the static-mapping for the flatten operation results in a mismatch between the outputs of the source framework (e.g., three-dimensional output tensor (N, C, H×W) and the target framework (e.g., one-dimensional output tensor (H×W×C).

Figure 5E:
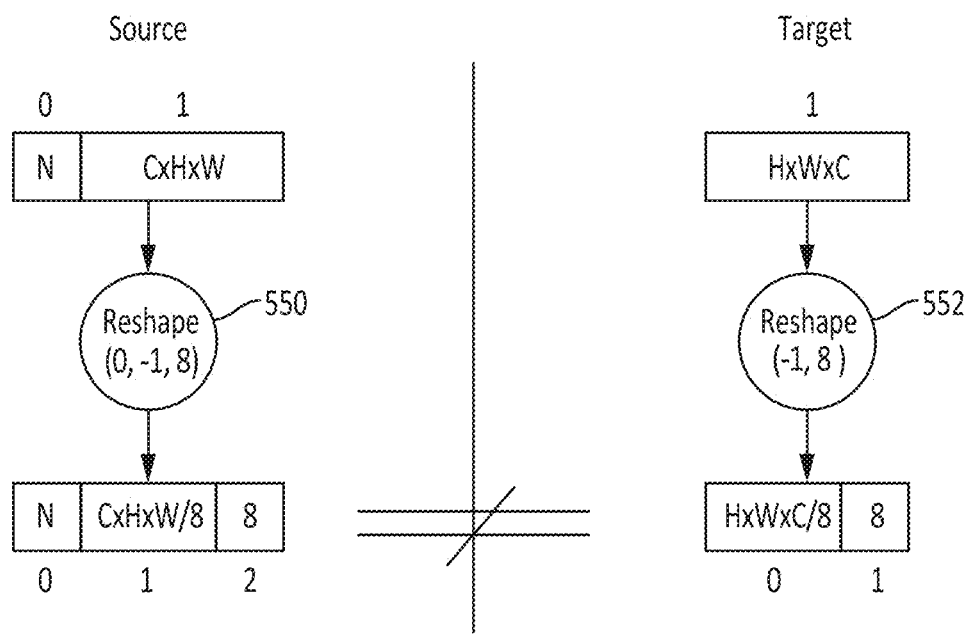

FIG. 5E illustrates an example of translating a reshape operation. As shown in FIG. 5E, a source framework performs a reshape operation 550 on an input (N, C×H×W). The reshape operation may be used to change the dimensions of its input, without changing its data. For the reshape operation only the dimensions are changed; no data is copied in the process. The reshape operation includes various parameters. 0 refers to "copy the respective dimension of the bottom layer." For example, if the bottom has two as its first dimension, the top will also have two as its first dimension, given a dimension of zero as the first target dimension. −1 refers to "infer this from the other dimensions." This dimension is calculated to keep the overall element count the same as in the bottom layer. A positive number refers to the dimension of the output of the reshape operation. In this example, the parameters of the reshape of the source framework are (0, −1, 8). As shown in FIG. 5E, the reshape operation 550 generates an output (N, C×H×W/8, 8).

Using the static-mapping, the axis parameter for a reshape operation 552 the target framework is set to (−1, 8). In this example, the output of the reshape operation 552 of the target framework is (H×W×C/8, 8). As shown in FIG. 5E, the static-mapping for the reshape operation results in a mismatch between the outputs of the source framework (e.g., three-dimensional output tensor (N, C×H×W/8, 8)) and the target framework (e.g., two-dimensional output tensor (H×W×C/8, 8).

As shown in the examples of FIGS. 5A-5E, in some cases, the static-mapping results in a match between the output of the source framework and the output of the target framework. Still, in some cases, a mismatch (e.g., computational error) may occur based on the explicit operations of the framework. Explicit operations refer to operations that are specified in a model. Aspects of the present disclosure mitigate a mismatch by adding implicit operations to a model. Implicit operations are operations that are not specified in a model but are added to re-order an axis order of a tensor before or after an explicit operation. In one configuration, the implicit operations re-order the dimensions of a tensor of the target framework to match an order of dimensions of a tensor of a source framework prior to an explicit operation.

The axis orders for some operations are known a priori. Still, certain operations, such as reshape or flatten, publish their axis order as "nontrivial" (NT). An axis order is published as "nontrivial" when the manipulation of the axis order by the operation is untrackable. That is, the output order of the operation may not be known a priori. For example, a four-dimensional (4D) input may become a two-dimensional (2D) output based on the parameters (e.g., axis parameter) of the operation. Specifically, untrackable refers to an operation itself, such as reshape or flatten, where the operation can manipulate an axis in various ways, such that the axis order cannot be derived after the operation. Thus, the axis order of such an operation is published as "nontrivial." In other cases, certain operations, such as permute, concatenate (concat), slice, or Softmax, may accept the input in any axis order. These operations may result in the axis order being published as "any." The input/output axis order is published as "any" based on the number of dimensions that are input/output. For example, 4D is published as [any, any, any, any], 3D is published as [any, any, any], and 2D is published as [any, any]. ANY suggests that a given operation may accept an input in any axis order. For example, the input may be (HCW), (WHC), or (NT NT NT). In one example a concatenate operation accepts inputs in any axis order and its accompanying axis parameter indicates the axis for performing the concatenation.

An implicit operation may be a convergence or a divergence using a permute operation. In one configuration, a convergence is performed when an untrackable operation (e.g., reshape or flatten) is encountered. That is, the convergence may be performed to align the current axis order of the target framework with the current axis order of the source framework prior to the untrackable operation. In one configuration, the convergence is performed via a permute operation.

According to another aspect of the present disclosure, a divergence is performed when a trackable operation (e.g., convolution (cony)) is encountered when the current state is untrackable. In one configuration, the divergence is performed when the trackable operation specifies a different expected input axis order between the source and target frameworks. The divergence results in a transition of the axis order of the target framework from an untrackable to a trackable state. In one configuration, a forced divergence is performed via a permute operation.

In one configuration, before an input axis (e.g., tensor) is input to a given operation, its axis order may be compared with the expected input axis order of the given operation. If the input's axis order matches the expected input axis order of the given operation, a permute operation may not be performed. That is, the permute may be skipped and the given operation may be performed on the current input axis order.

As discussed above, some operations may be trackable. For example, the operations publishing their axis orders in an order the is different than nontrivial may be considered trackable. Other operations may be untrackable. For example, operations publishing nontrivial axis orders may be considered untrackable. The resulting state after a trackable operation is trackable/trivial and the resulting state after an untrackable operation is untrackable/nontrivial. In one configuration, a trackable operation may output to an untrackable operation. For example, a trackable operation may output a three-dimensional axis (e.g., (H, W, C)) and the untrackable may output a nontrivial (NT) output (e.g., the dimension may not be known a priori). This scenario may, for example, result from performing a convolution (e.g., trackable operation) followed by a reshape (e.g., untrackable operation). Prior to inputting the tensor to the untrackable operation, the current axis order output from the trackable operation of both the source and the target frameworks are compared. A permute operation (e.g., convergence) may be performed to align the target axis order to the source axis order prior to the untrackable operation.

In another configuration, an untrackable operation may output to a trackable operation, for example, by performing operations, such as a reshape operation followed by a deconvolution (deconv) operation. In this configuration, the desired input axis order of deconv operation on both the source and target frameworks is known a priori. The output of the untrackable operation may be in a nontrivial state, such that both the source axis order and the target axis order are currently aligned/converged. An axis order may be considered trivial if, for example, the expected input axis order is known.

In this example, the expected axis order at the source may be (N, C, H, W) and the expected input axis order at the target is (H, W, C). In the current example, the current axis order of tensor at the source is [nontrivial, nontrivial, nontrivial, nontrivial] and the current axis order of tensor at the target is [nontrivial, nontrivial, nontrivial]. When an operation (e.g., deconv) has published its axis order as trivial, the permute order is computed based on the expected input axis order of operation (e.g., (N, C, H, W) (source) and (H, W, C) (target)). A divergence may be performed at the target so that the current axis order is transformed to an expected axis order. In one configuration, the divergence is performed via a permute operation.

In another scenario, a trackable operation may be followed by another trackable operation. For example, permute may be followed by a convolution. In this example, based on the trivial axis order of both operations, it may be known that the permute outputs an axis order of (H, W, C) and the convolution receives an axis order of (C, H, W). In one configuration, a permute order is computed from the current axis order of the target tensor and the input axis order of operation published in advance such that the expected axis order is received at the second trackable operation. In this example, the permute may be a divergence.

Figure 6A:
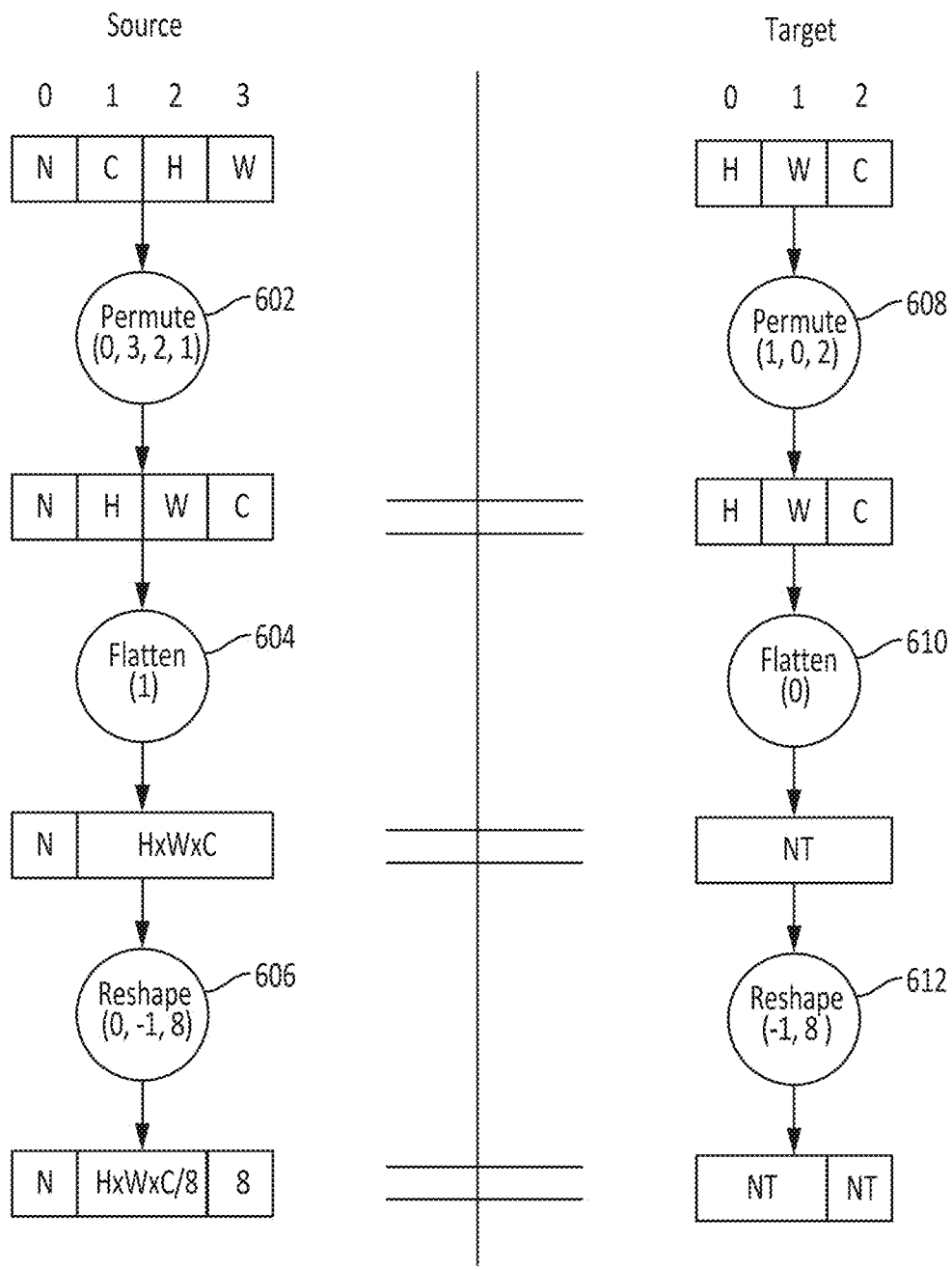
FIGS. 6A, 6B, 6C, and 6D are diagrams illustrating exemplary source framework to target framework conversions in accordance with aspects of the present disclosure.

FIG. 6A illustrates an example of trackable operations according to aspects of the present disclosure. As shown in FIG. 6A, a source framework (e.g., Caffe) includes a permute operation 602, a flatten operation 604, and a reshape operation 606. The target framework includes the same explicit operations as the source framework (e.g., permute 608, flatten 610, and reshape 612). The permute operations 602, 608 are trackable operations. That is, the axis order of the permute operations 602, 608 are published so that the system knows a priori the axis order of an output of the permute operation. In this example, the output axis order of the permute operation 608 of the target framework (H, W, C) is aligned with the output axis order of the permute operation 602 of the source framework (N, H, W, C). Thus, a forced permute (e.g., convergence) is not specified and a no-op is performed.

Additionally, in this example, a flatten operations 604, 610 follow the permute operations 602, 608. That is, the operations include a trackable operation followed by an untrackable operation. As the axis order of the source framework and target framework are aligned prior to the untrackable operation (e.g., flatten operations 604, 610) a convergence or divergence is not specified for the target framework as it is assumed the nontrivial (NT) output of the flatten operation 610 of the target framework will be aligned with the axis order of the source framework. That is, because the axis order of the source framework and target framework are aligned prior to the flatten operations 604, 610, it is assumed that the axis orders will be aligned after the flatten operations 604, 610. Therefore, in this example, the axis parameter of the flatten operation in the target framework is not manipulated as both the source and target frameworks are aligned.

As the output of the flatten operation 610 of the target framework is nontrivial, it is assumed that the axis orders of the source and target frameworks are aligned prior to the reshape operations 606, 612. Because the reshape operations 606, 612 are also untrackable operations, a forced permute is not performed at the target framework prior to the reshape operation 612. In the current example, it is assumed that the final output of the source and target frameworks will be aligned.

Figure 6B:
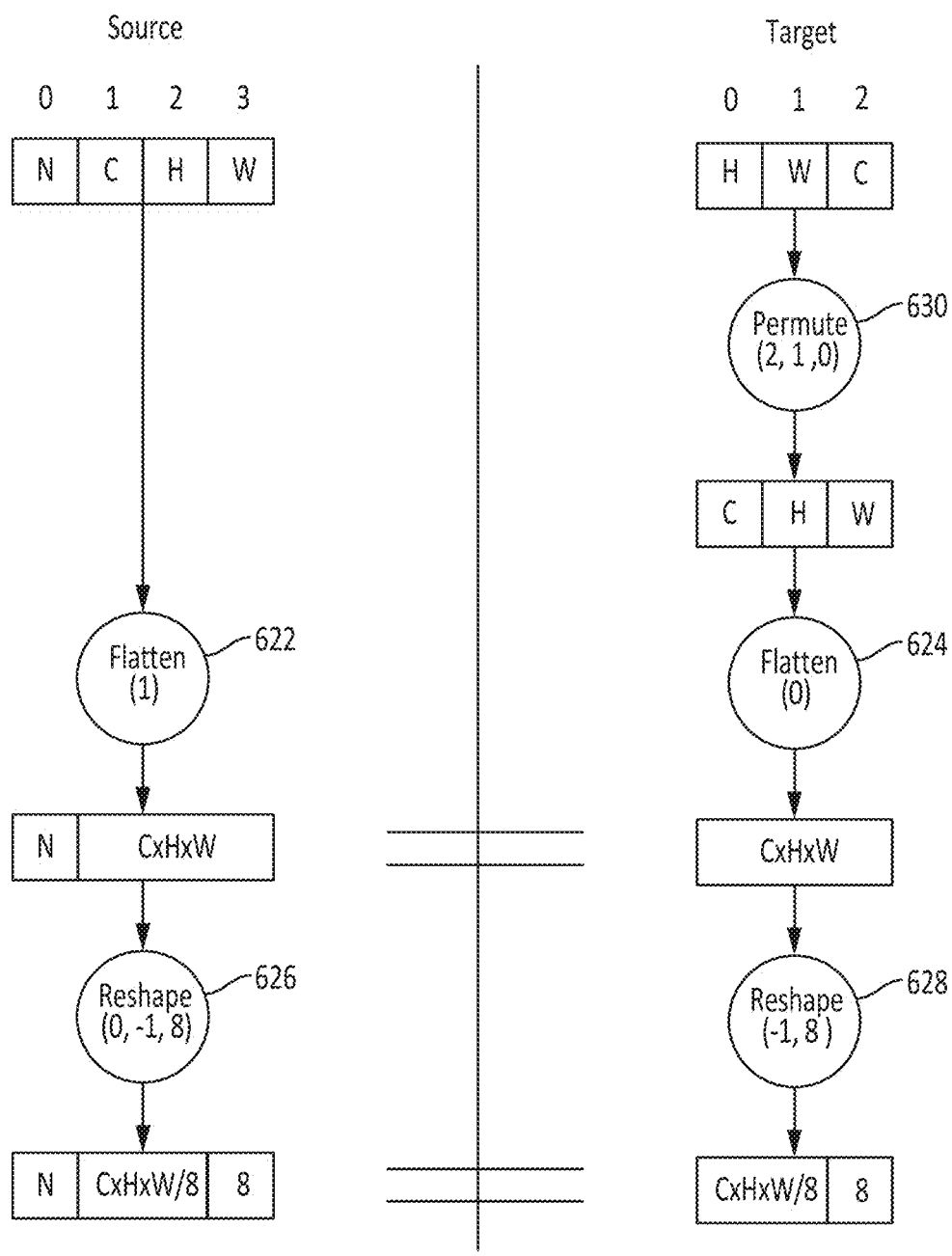

FIG. 6B illustrates an example of a forced permute according to aspects of the present disclosure. As shown in FIG. 6B, the source and target frameworks include the explicit operations of flatten 622, 624 followed by reshape 626, 628. As previously discussed, a flatten operation is an untrackable operation, such that the output axis order is nontrivial. In the present example, the axis order of the target framework (H, W, C) is different from the axis order of the source framework (N, C, H, W) prior to the flatten operations 622, 624. Due to the unaligned axis orders prior to the flatten operations 622, 624, the output axis order of the flatten operations 622, 624 may also be unaligned. Therefore, in one configuration, a forced permute 630 (e.g., convergence) is specified at the target framework prior to the flatten operation 624 of the target framework. The forced permute 630 is intended to align the axis orders of the source and target frameworks prior to the flatten operations 622, 624. In this example, the forced permute 630 transforms the input axis order (H, W, C) to (C, H, W) to be aligned with the axis order of the source framework (N, C, H, W). Once the axis orders are aligned, it is assumed that the axis orders will be aligned after the flatten operations 622, 624.

In the current example, the output of the flatten operation 624 of the target framework is nontrivial, thus, it is assumed that the axis orders of the source and target frameworks are aligned prior to the reshape operations 626, 628. Because the reshape operations 626, 628 are also untrackable operations, a forced permute is not performed at the target framework prior to the reshape operation 628. In the current example, it is assumed that the final output of the source and target frameworks will be aligned.

Figure 6C:
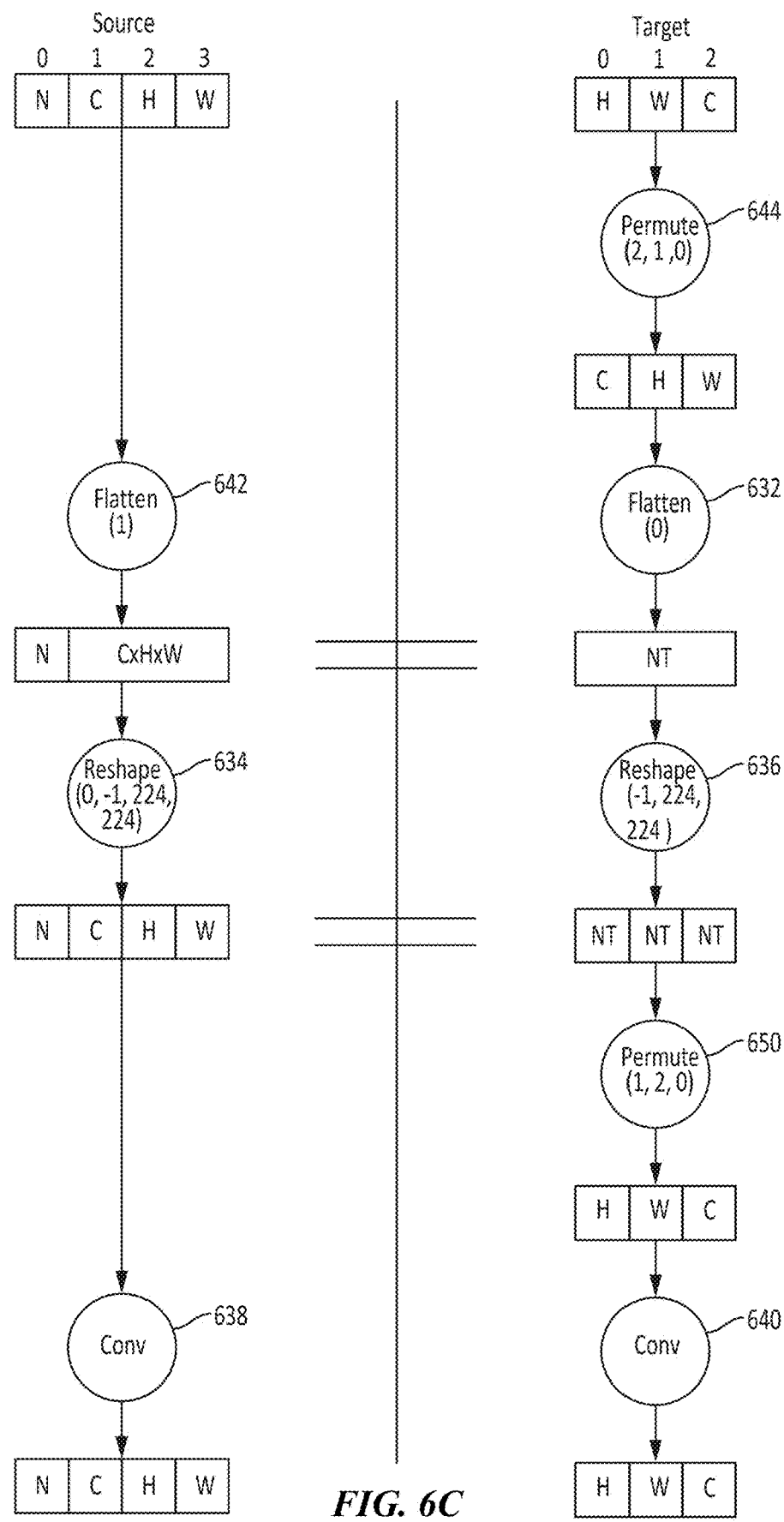

FIG. 6C illustrates an example of a forced permute according to aspects of the present disclosure. As shown in FIG. 6C, the source and target frameworks include the explicit operations of flatten 642, 632, reshape 634, 636, and convolution 638, 640. As previously discussed, a flatten operation is an untrackable operation, such that the output axis order is nontrivial. Similar to the example of FIG. 6B, in the present example, the axis order of the target framework (H, W, C) is different from the axis order of the source framework (N, C, H, W) prior to the flatten operations 630, 632. Therefore, in the current example, a forced permute 644 (e.g., convergence) is specified at the target framework prior to the flatten operation 632 of the target framework. The forced permute 644 is intended to align the axis orders of the source and target frameworks prior to the flatten operations 642, 632. In this example, the forced permute 640 transforms the input axis order (H, W, C) to (C, H, W) to be aligned with the axis order of the source framework (N, C, H, W). Once the axis orders are aligned, it is assumed that the axis orders will be the same after the flatten operations 642, 632.

In the current example, the output of the flatten operation 632 of the target framework is nontrivial. Thus, it is assumed that the axis orders of the source and target frameworks are aligned prior to the reshape operations 634, 636. Because the reshape operations 634, 636 are also untrackable operations, a forced permute is not performed at the target framework prior to the reshape operation 636.

Still, in the current example, a convolution 638, 640 is performed after the reshape 634, 636. That is, a trackable operation is performed after an untrackable operation. As the convolution 638, 640 is trackable, the expected input axis order is published. In this example, the expected input axis order for the convolution 640 of the target framework is (H, W, C). Still, the output of the reshape 636 of the target framework is nontrivial and assumed to be aligned with the output axis order of the reshape 634 of the source framework (N, C, H, W). Therefore, to transform the current axis order of the target framework to an expected axis order for the convolution 640, a force permute 650 (e.g., divergence) is specified prior to the convolution 640 to transform the current axis order to the expected axis order of the convolution 640.

Aspects of the present disclosure use the knowledge of a current axis order of a tensor and may omit operations, resulting in improved processing speed. For example, in the single shot multibox detector (SSD) models, during model conversion from Caffe-to-SNPE, a permute operation is omitted because the SNPE's axis order is already in the order that the Caffe framework permute operation would produce.

Figure 6D:
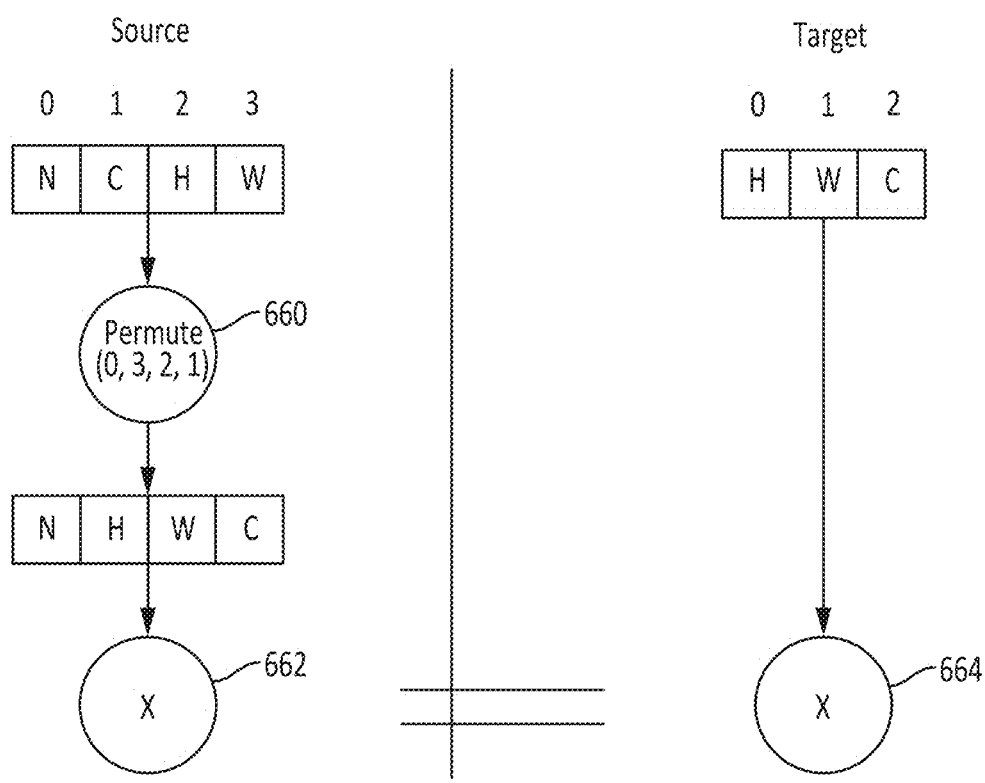

FIG. 6D illustrates an example of omitting a permute according to aspects of the present disclosure. As shown in FIG. 6D, the source framework may perform a permute 660 followed by a second operation 662, such as a permute, flatten, or reshape. In the current example, the permute 660 receives an input (N, C, H, W) and outputs (N, H, W, C). Furthermore, the initial axis order (e.g., current axis order) (H, W, C) of the target framework may already be aligned with the output axis order of the permute 660 of the source framework. Thus, in this example, the permute 660 of the source framework may be omitted from the target framework, such that the initial axis order of the target framework is input directly to a second operation 664 of the target framework. That is, during the generation of the trained model in the target framework, the permute operation is omitted.

In one configuration, the state of the axis order may be stored in a tensor and/or a memory device for subsequent use. Of course, this is merely exemplary and not limiting. The current axis order of the tensor may be updated using the output axis order of operation. The update may be performed on both the source and the target.

Additionally, in some aspects, an accompanying axis parameter may aid the operation to pick a particular dimension on which to operate. For example, for a concatenation (concat) operation, the axis parameter indicates on which axis the concatenation of the inputs is to take place. In one example, concat receives three inputs of dimensions (5, 3, 4); (5, 3, 8) and (5, 3, 10). Furthermore, in this example, if an axis parameter is (2), the output of concat becomes (5,3,22). Similarly for a slice operation, the axis parameter indicates on which axis slicing of an input is to take place. For example, a slice operation may receive one input of (10, 4, 9) and produce two outputs evenly when the axis parameter is specified as (0). That is, the slice operation produces two outputs of dimensions (5, 4, 9) and (5, 4, 9).

As an another example, if the current axis order of a four-dimensional (4D) tensor on the source is (N, C, H, W) and the current axis order of a three-dimensional (3D) tensor on target is (H, W, C), the concat operation applied to a tensor on the source with axis set to one may map the concat operation on a tensor on the target with axis set to two. The axis refers to the axis parameter associated with the operation. In yet another example, if the current axis order of a 4D tensor on the source is [nontrivial, nontrivial, nontrivial, nontrivial] and the current axis order of the 3D tensor on the target is [nontrivial, nontrivial, nontrivial], the concat operation on the tensor on the source with axis set to one maps the concat operation on the tensor on the target with axis set to zero, by decrementing the source axis parameter by one. Nontrivial refers to the axis order of both source and target being aligned. Additionally, because the target does not support the N dimension, the axis is decremented by one. If the target and source support an equal number of dimensions, the source axis set to one would have mapped to the target axis set to one.

The mapping or model conversions may be conducted offline or may be performed during runtime (e.g., online). Furthermore, in one configuration, the target platform may support multiple platforms, such as a digital signal processor (DSP), a graphics processing unit (GPU), a central processing unit (CPU) and other platforms. In such systems, the mapping may be dynamically performed at runtime according to a specified platform. During runtime, the axis of each tensor may be tracked, such that when a scheduler selects a particular operation on a source platform, the operation is evaluated to determine whether to perform a data transformation for axis order. The determination of whether to perform the data transformation may be possible when the current axis order of the tensor and the scheduled operation's expected input axis order on a given platform are known in advance.

Mapping the axis order in the manner described herein provides for the use of models with increased complexity (e.g., using reshape/flatten/permute) based on performance of conversions without user intervention. Furthermore, aspects of the present disclosure permit the inference engine/framework to choose their implementation of operation with particular axis order to use underlying hardware architecture regardless of source framework.

Figure 7A:
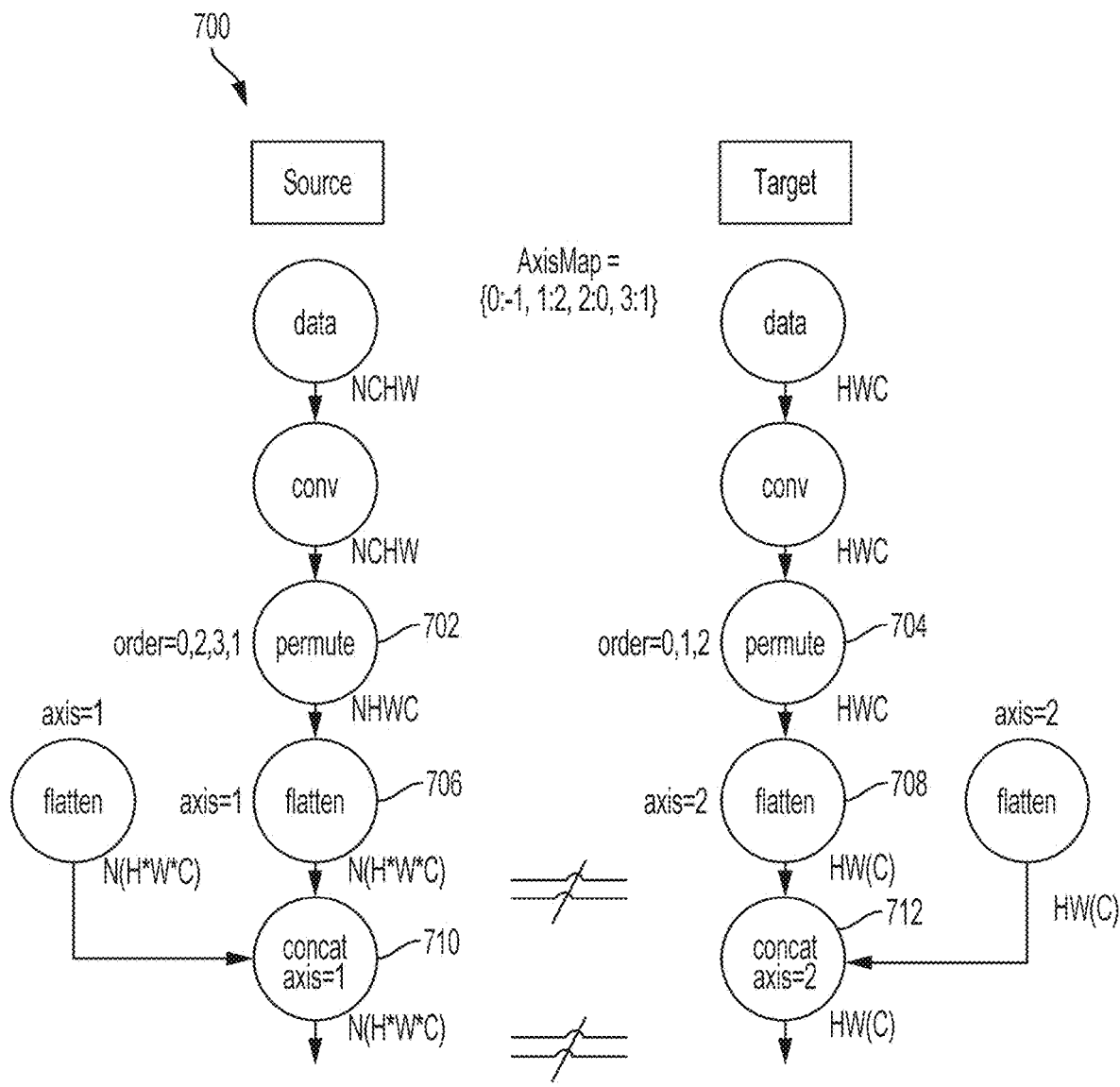
FIGS. 7A and 7B are diagrams illustrating an exemplary conversion based on an axis parameter in accordance with aspects of the present disclosure.

FIG. 7A illustrates a diagram 700 of a conversions based on an axis parameter. FIG. 7A illustrates an example of the problems that may occur with static axis mapping during a conversion. As shown in FIG. 7A, a source framework and target framework may comprise the same operations (e.g., cony, permute, flatten, concat). Still, conventional mapping techniques may fail to appropriately compute certain operations that use an axis parameter such as concatenate.

For example, as shown in FIG. 7A, a source axis order and target axis order are aligned (H, W, C) after permute operations 702, 704. Each of the permute operations 702, 704 output to flatten operations 706, 708, which is proceeded by concat operations 710, 712. In this example, an axis parameter (1) of the source framework for the flatten operation 706 and concat operation 710 is different from an axis parameter (2) for the flatten operation 708 and concat operation 712. The difference in axis parameters results in a mapping error between the output of the source framework (N(H*W*C)) and the target framework (HW(C)).

Figure 7B:
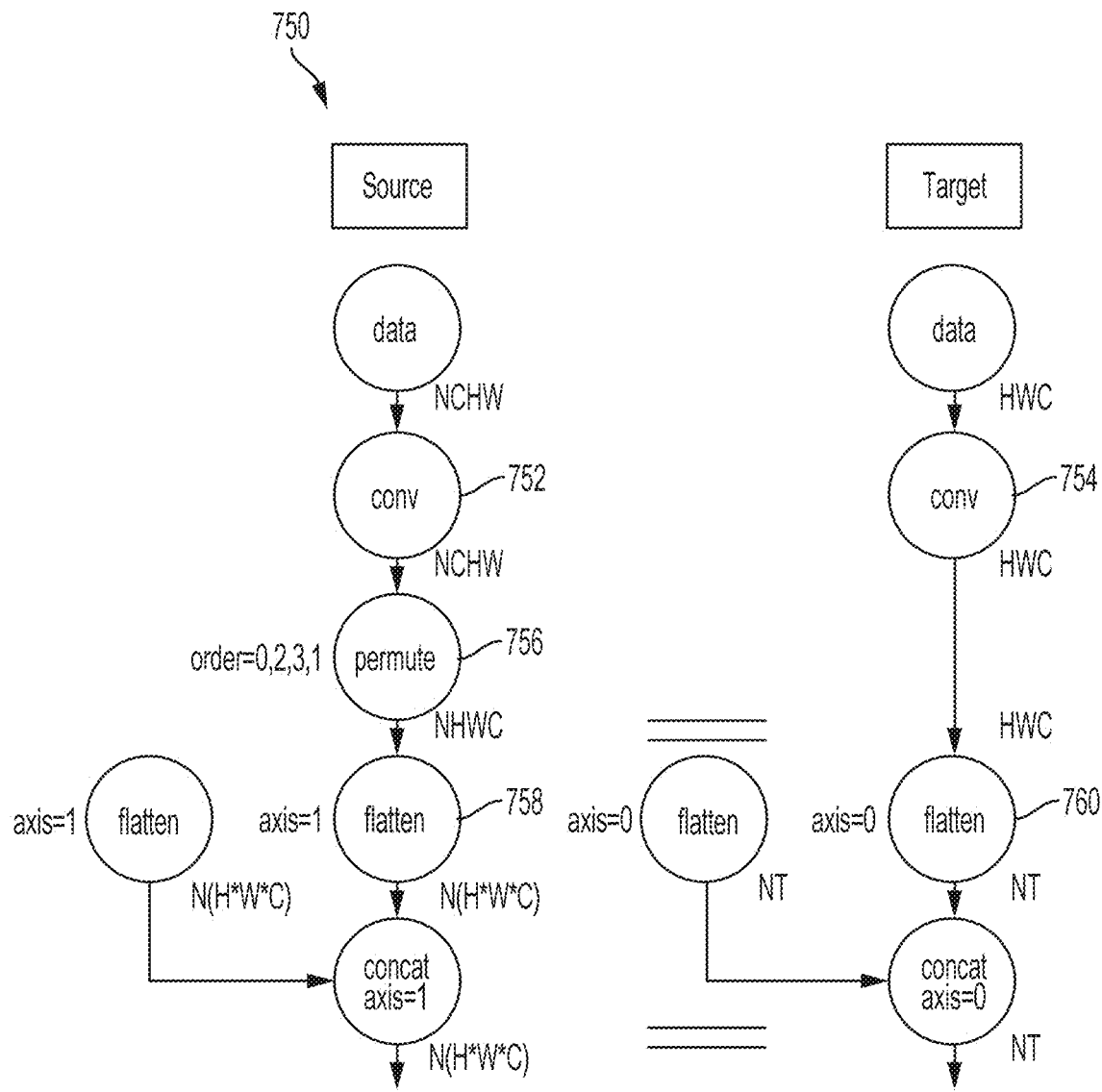

FIG. 7B illustrates a diagram 750 of a conversion based on an axis parameter in accordance with aspects of the present disclosure. FIG. 7B illustrates an example of mitigating problems arising from conventional conversions. As shown in FIG. 7B, the source framework and target framework perform a convolution operation 752, 754 on the input tensor having an axis order of (N, C, H, W) and (H, W, C), respectively. The output axis order of the convolution 754 is aligned with the output axis order of the permute 756 of the source framework. Furthermore, a flatten operation 758 follows the permute 756. As the flatten operation 758 is an untrackable operation, the source axis order should be aligned with the target axis order prior to performing the flatten operations 758, 760. As the output axis order of the convolution 754 is aligned with the output axis order of the permute 756 of the source framework, the permute may be skipped at the target framework to improve performance.

Additionally, as shown in the current example, the axis parameter of the target framework is adjusted (in comparison to the axis parameter of FIG. 7A) to align the outputs of the source and target framework. That is, after the convolution 754 of the target framework and the permute 756 of the source framework, the axis orders of both the source and target framework are aligned. Thus, the axis parameter of the target framework is computed by deducting one (e.g., adjusting the axis parameter of the target framework) from the axis parameter of the source framework as the target framework does not support the (N) parameter of the source framework (e.g., the target framework) has one less axis than the source framework. The flatten operation 758 of the source framework is performed with axis=1 and the corresponding flatten operation 760 of the target framework is carried out with axis=0. Likewise, the subsequent concat operation of target framework is performed with axis=0 because the corresponding concat operation of the source framework is performed with axis=1.

Figure 8:
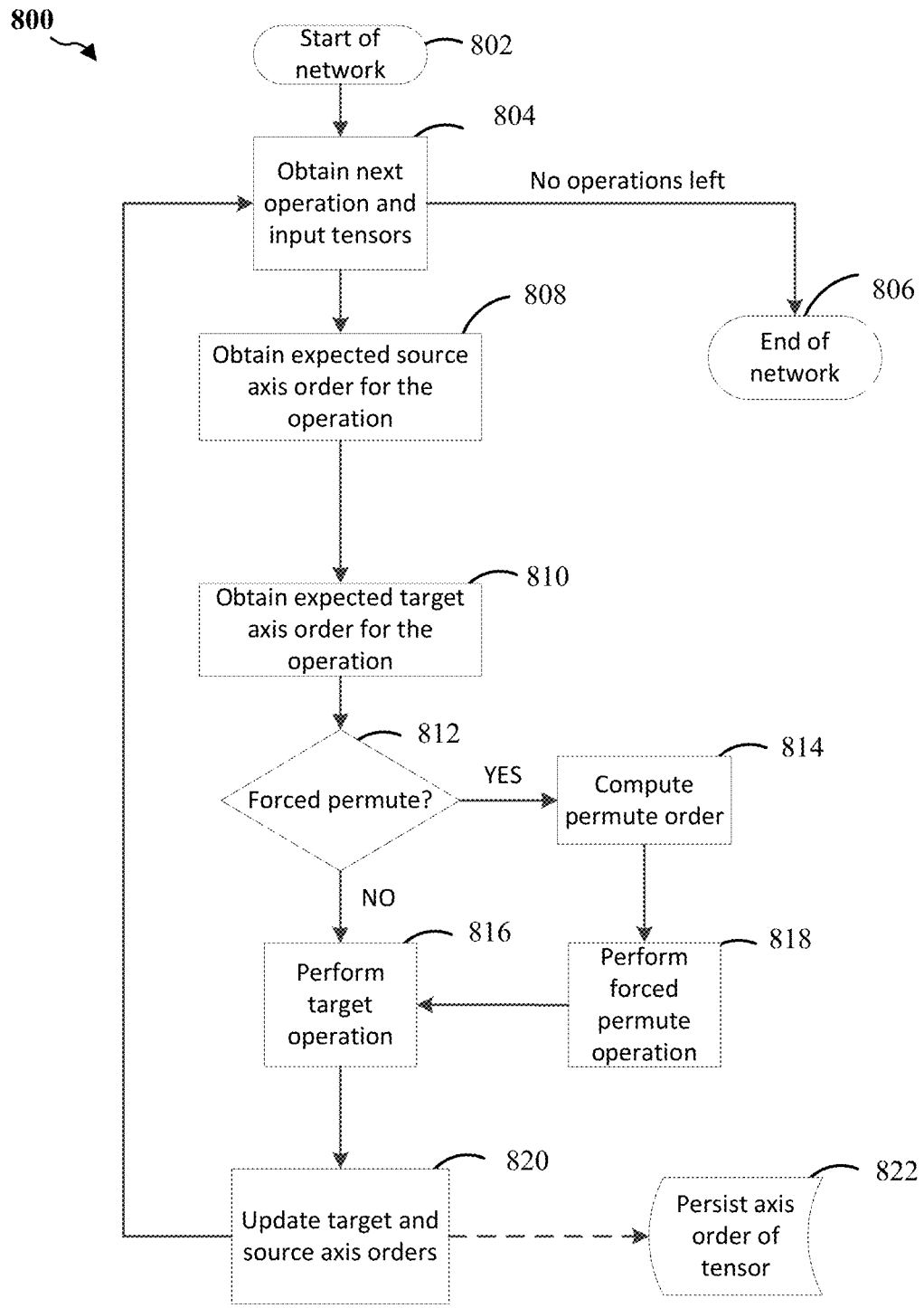
FIGS. 8 and 9 are exemplary flow diagrams illustrating methods for tracking axes during model conversion in accordance with aspects of the present disclosure.

FIG. 8 is an exemplary flow diagram illustrating a method 800 for tracking axes during model conversion in accordance with aspects of the present disclosure. As shown in the exemplary diagram of FIG. 8, at block 804, after the start of the network (802), the next operation (e.g., permute, cony, reshape, flatten) and the current tensors (e.g., axis order) are obtained. If there are no further operations, the end of the network has been reached and no further actions are performed (806).

At block 808, the expected source axis order for the operation is obtained. Additionally, at block 810, the expected target axis order for the operation is obtained. For some operations, such as convolution (cony), the input/output axis order is published. For other operations, such as flatten and reshape, the output axis order is untrackable. Thus, the input/output is nontrivial. Still, for other operations, such as concatenate (concat), the input/output order is any. Based on the operation, the expected target axis order, and the expected source axis order, the network determines whether a forced permutation of the current tensor (e.g., current target axis order) should be performed (812).

A forced permute may not be performed if the current source and target axis orders are aligned before an operation, such as an untrackable operation. In another example, a forced permute may not be performed if the current target axis order is aligned with an expected target axis order for an operation at the target framework (e.g., convolution operation). If a forced permute should not be performed, the operation is performed at the target framework (block 816).

If a forced permute should be performed, the permute order is determined at block 814. As an example, for the snapdragon neural processing engine (SNPE) framework, the permute order is determined from one of the possible axis orders: the six possible permutations of (H, W, C); (C); (H, W); (W, H); (NT, NT, NT); (NT, NT); and (NT). In one example, the determined permute order is an alignment of the current source and target axis order (e.g., convergence) prior to an untrackable operation. As another example, the determined permute order is an alignment of the current target axis order with an expected axis order for a convolution (e.g., divergence).

At block 818, the forced permute operation is performed. In one configuration, the permute operation is performed at the target framework. After performing the permutation, the operation is performed at the target framework (block 816). Based on the operation, the current target and source axis orders are updated based on the output order of the operation (block 820). After updating the current target and source axis orders, the system obtains the next operations and current axis orders (block 804). Additionally, in an optional configuration, the axis order of the tensor may be persistent (block 822). That is, the axis order may be written into a file/database.

Figure 9:
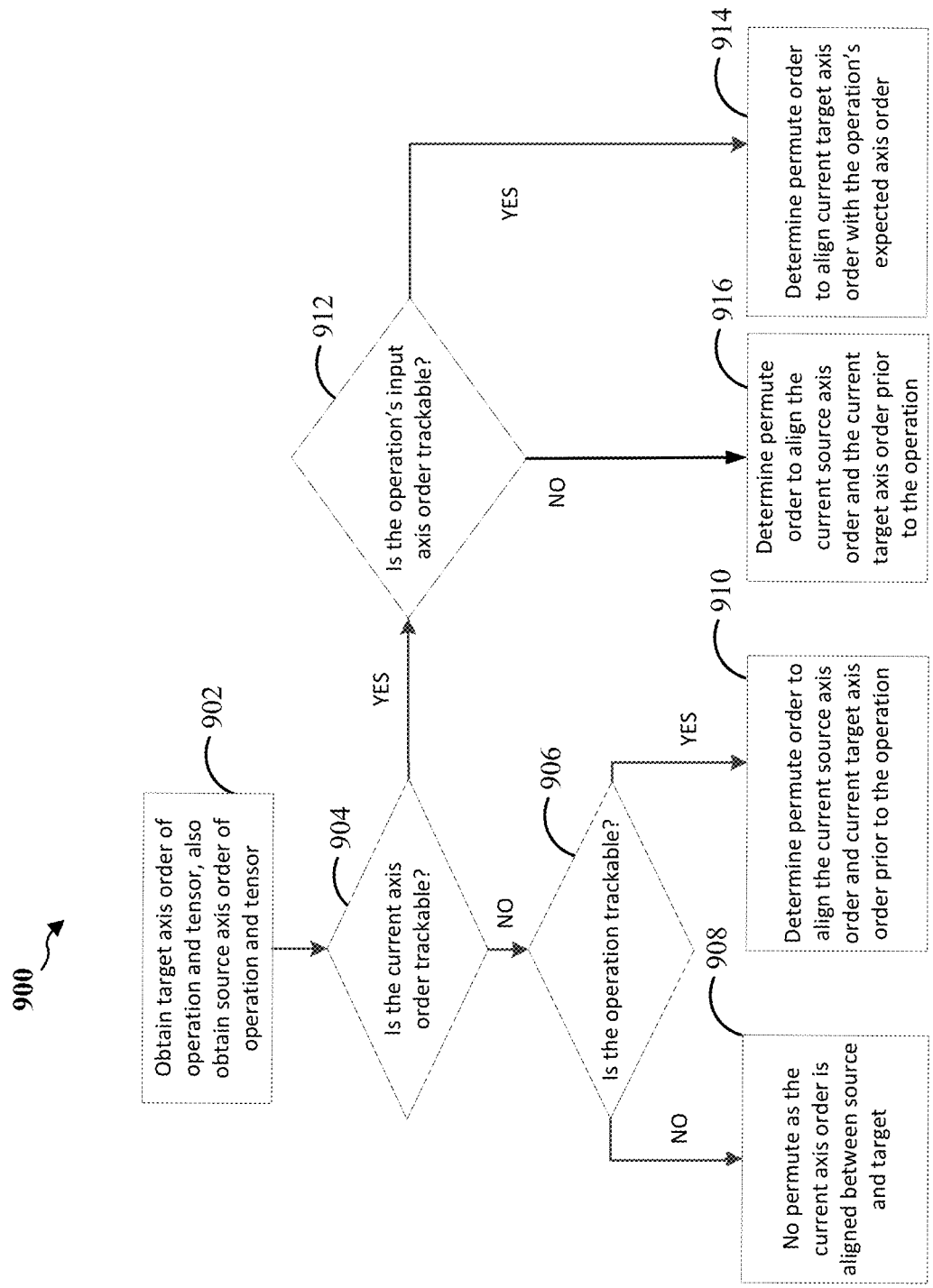

FIG. 9 is an exemplary flow diagram illustrating a method 900 for tracking axes during model conversion in accordance with aspects of the present disclosure. At block 902, the target axis order of an operation and the target tensor are obtained. In addition, at block 902, the source axis order of an operation and the source tensor are obtained. The target axis order refers to the expected input axis order of operation in the target framework and the source axis order refers the expected input axis order of operation in the source framework. The tensor is the current axis order of the tensor prior to being input to the operation. At block 904, the system determines whether the current axis order of tensor (e.g., target tensor) prior to being input to the operation (e.g., current tensor) is trackable (e.g., the output of the previous operation was trackable (e.g., current axis order is trackable).

If the tensor's axis order is not trackable, the system determines whether the operation is trackable (906). In some cases, the output from a previous operation is trackable. Still, the current operation may not be trackable. For example, the output of a flatten operation is untrackable even if the input (e.g., output from the previous operation) is trackable (see elements 644 and 632 of FIG. 6C). If the operation is not trackable, a permute is not performed as the current axis order is aligned between the source and the target (block 908). The axis order refers to the tensor's axis order. If the operation's input axis order is trackable, a permute order is computed so that the current target axis order aligns with the current source axis order prior to the operation (block 910).

As shown in FIG. 9, if the current axis order is trackable, the system determines whether the input axis order of the operation is trackable (912). If the operation's input axis order is not trackable, a permute order is computed to align the current target axis order with the current source axis order prior to the operation (block 916). If the operation's input axis order is trackable, a permute order is determined to align the current target axis order with the expected axis order of the operation at the target framework (914).

Figure 10:
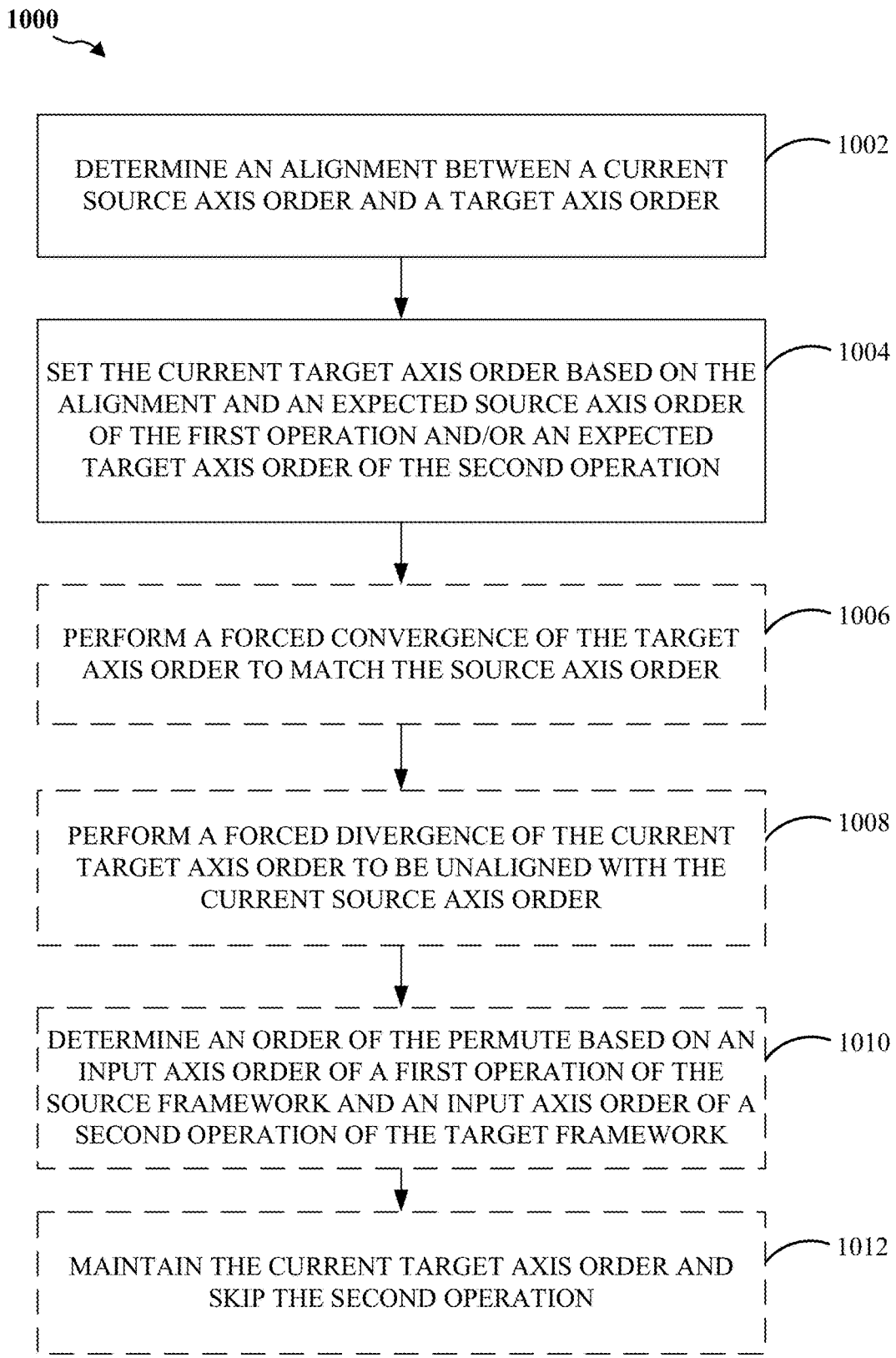
FIG. 10 illustrates a method for mapping a first operation of a source framework to a second operation of a target framework for an artificial neural network according to aspects of the present disclosure.

FIG. 10 illustrates a method 1000 for mapping a first operation of a source framework to a second operation of a target framework for an artificial neural network. The first operation refers to a specific operation of the source frame and is not limited to the first operation in a series of operations. Likewise, the second operation refers to a specific operation of the target frame and is not limited to the second operation in a series of operations. In block 1002, the process determines an alignment between a current source axis order and a target axis order. In block 1004, the process sets the current target axis order based on the alignment, and an expected source axis order of the first operation and/or an expected target axis order of the second operation.

In an optional configuration, at block 1006, the setting includes performing a forced convergence of the target axis order to match the source axis order. In one configuration, the forced convergence includes performing a permute operation in the target framework when the current target axis order is trackable and the expected target axis order is untrackable. The permute operation order may be determined from the current source axis order and the current target axis order.

In another optional configuration, at block 1008, the setting includes performing a forced divergence of the current target axis order to be unaligned with the current source axis order. In one configuration, the forced divergence includes performing a permute operation in the target framework when the current target axis order is untrackable and the expected target order is trackable. In an optional configuration, at block 1010, an order of the permute operation is determined based on an input axis order of a first operation of the source framework and an input axis order of a second operation of the target framework.

In yet another optional configuration, at block 1012, the setting comprises maintaining the current target axis order and skipping the second operation (e.g., second permute operation). In one configuration, the second operation is skipped when the current target axis order is aligned with the current source axis order. According to aspects of the present disclosure, the target framework is configured to support multiple platforms, and the setting is dynamically performed at runtime based on a selected platform.

In some aspects, the methods 700, 750, 800, 900, and 1000 may be performed by the SOC 100 (FIG. 1) or the system 200 (FIG. 2). That is, each of the elements of the methods 700, 750, 800, 900, and 1000 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein a. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of mapping a first operation of a source framework to a second operation of a target framework for an artificial neural network, the method comprising:
    determining an alignment between a current source axis order and a current target axis order; and
    setting the current target axis order based on the alignment, and at least one of an expected source axis order of the first operation, an expected target axis order of the second operation, or a combination thereof.

2. The method of claim 1, in which setting the current target axis order comprises performing a forced convergence of the current target axis order to match the current source axis order.

3. The method of claim 2, in which performing the forced convergence comprises performing a permute operation in the target framework when the current target axis order is trackable and the expected target axis order is untrackable, a permute operation order computed from the current source axis order and the current target axis order.

4. The method of claim 1, in which setting the current target axis order comprises performing a forced divergence of the current target axis order to be unaligned with the current source axis order.

5. The method of claim 4, in which performing the forced divergence comprises performing a permute operation in the target framework when the current target axis order is untrackable and the expected target axis order is trackable.

6. The method of claim 5, further comprising determining an order for the permute operation based on a source input axis order of the first operation of the source framework and a target input axis order of the second operation of the target framework.

7. The method of claim 1, in which setting the current target axis order comprises maintaining the current target axis order and skipping the second operation when the current target axis order is aligned with the current source axis order.

8. The method of claim 1, in which the target framework supports multiple platforms, and setting the current target axis order is dynamically performed at runtime based on a selected platform.

9. A apparatus for mapping a first operation of a source framework to a second operation of a target framework for an artificial neural network, the apparatus comprising:
    means for determining an alignment between a current source axis order and a current target axis order; and
    means for setting the current target axis order based on the alignment, and at least one of an expected source axis order of the first operation, an expected target axis order of the second operation, or a combination thereof.

10. The apparatus of claim 9, in which the means for setting comprises means for performing a forced convergence of the current target axis order to match the current source axis order.

11. The apparatus of claim 10, in which the means for performing the forced convergence comprises means for performing a permute operation in the target framework when the current target axis order is trackable and the expected target axis order is untrackable, a permute operation order computed from the current source axis order and the current target axis order.

12. The apparatus of claim 9, in which the means for setting comprises means for performing a forced divergence of the current target axis order to be unaligned with the current source axis order.

13. The apparatus of claim 12, in which the means for performing the forced divergence comprises means for performing a permute operation in the target framework when the current target axis order is untrackable and the expected target axis order is trackable.

14. The apparatus of claim 13, further comprising means for determining an order for the permute operation based on a source input axis order of the first operation of the source framework and a target input axis order of the second operation of the target framework.

15. The apparatus of claim 9, in which the means for setting comprises means for maintaining the current target axis order and skipping the second operation when the current target axis order is aligned with the current source axis order.

16. The apparatus of claim 9, in which the target framework supports multiple platforms, and the means for setting is dynamically performed at runtime based on a selected platform.

17. A apparatus for mapping a first operation of a source framework to a second operation of a target framework for an artificial neural network, the apparatus comprising:
  a memory; and
  at least one processor coupled to the memory, the at least one processor configured:
    to determine an alignment between a current source axis order and a current target axis order; and
    to set the current target axis order based on the alignment, and at least one of an expected source axis order of the first operation, an expected target axis order of the second operation, or a combination thereof.

18. The apparatus of claim 17, in which the at least one processor is configured to perform a forced convergence of the current target axis order to match the current source axis order.

19. The apparatus of claim 18, in which the at least one processor is configured to perform a permute operation in the target framework when the current target axis order is trackable and the expected target axis order is untrackable, a permute operation order computed from the current source axis order and the current target axis order.

20. The apparatus of claim 17, in which the at least one processor is configured to perform a forced divergence of the current target axis order to be unaligned with the current source axis order.

21. The apparatus of claim 20, in which the at least one processor is configured to perform a permute operation in the target framework when the current target axis order is untrackable and the expected target axis order is trackable.

22. The apparatus of claim 21, in which the at least one processor is configured to determine an order for the permute operation based on a source input axis order of the first operation of the source framework and a target input axis order of the second operation of the target framework.

23. The apparatus of claim 17, in which the at least one processor is configured to maintain the current target axis order and skip the second operation when the current target axis order is aligned with the current source axis order.

24. The apparatus of claim 17, in which:
  the target framework supports multiple platforms, and
  the at least one processor is configured to dynamically set the current target axis order at runtime based on a selected platform.

25. A non-transitory computer-readable medium having program code recorded thereon for mapping a first operation of a source framework to a second operation of a target framework for an artificial neural network, the program code executed by at least one processor and comprising:
  program code to determine an alignment between a current source axis order and a current target axis order; and
  program code to set the current target axis order based on the alignment, and at least one of an expected source axis order of the first operation, an expected target axis order of the second operation, or a combination thereof.

26. The non-transitory computer-readable medium of claim 25, in which the program code to set the current target axis order further comprises program code to perform a forced convergence of the current target axis order to match the current source axis order.

27. The non-transitory computer-readable medium of claim 26, in which the program code to perform the forced convergence comprises program code to perform a permute operation in the target framework when the current target axis order is trackable and the expected target axis order is untrackable, a permute operation order computed from the current source axis order and the current target axis order.

28. The non-transitory computer-readable medium of claim 25, in which the program code to set the current target axis order comprises program code to perform a forced divergence of the current target axis order to be unaligned with the current source axis order.

29. The non-transitory computer-readable medium of claim 28, in which the program code to perform the forced divergence comprises program code to perform a permute operation in the target framework when the current target axis order is untrackable and the expected target axis order is trackable.

30. The non-transitory computer-readable medium of claim 29, further comprising program code to determine an order for the permute operation based on a source input axis order of the first operation of the source framework and a target input axis order of the second operation of the target framework.

31. The non-transitory computer-readable medium of claim 25, in which the program code to set the current target axis order comprises program code to maintain the current target axis order and skip the second operation when the current target axis order is aligned with the current source axis order.

32. The non-transitory computer-readable medium of claim 25, in which the target framework supports multiple platforms, and the program code to set the current target axis order is dynamically executed at runtime based on a selected platform.

* * * * *